United States Patent Office 3,285,760
Patented Nov. 15, 1966

3,285,760
REFRACTORY
William M. Hildinger, Campbell, William H. Boyer, San Jose, and Merton L. Van Dreser, Campbell, Calif., assignors to Kaiser Aluminum & Chemical Corporation, Oakland, Calif., a corporation of Delaware
No Drawing. Filed Sept. 27, 1965, Ser. No. 490,694
5 Claims. (Cl. 106—58)

This application is a continuation-in-part of application S.N. 300,089, filed August 5, 1963, now abandoned.

This invention relates to refractory compositions and more particularly to nonacid refractory compositions suitable for lining high temperature furnaces.

In one method of lining high temperature furnaces such as electric steel-melting furnaces, or Bessemer converters or the more recent development in this art known as the basic oxygen steel converter, it has been the practice to line the vessel, at least in part, with a carbonaceous-bonded nonacid or basic refractory material. In some instances these linings have been made up of preformed shapes of nonacid or basic refractory material bonded with a carbonaceous bonding agent such as tar or pitch, and in other instances such compositions have been gunned, cast or rammed into place in the furnace. Many compositions have been proposed for such operations but it has been a particular problem in this art, particularly with the ramming and casting mixes, for example, that the bulk refractory mixture shipped in containers, will set up or harden upon standing. This occurs, for instance, in areas of low temperature where the carbonaceous bond will solidify or harden and the ramming mixture becomes lumpy and loses cohesion, and exhibits poor ramming properties; and the mixture must be specially treated by the consumer to put it again into condition for use. It has been desired, therefore, that there be provided a cokable carbonaceous-bonded nonacid or basic refractory material which will remain moldable and cohesive and of proper sizing during storage and prior to installation in the furnace, so that it will withstand low temperature conditions, especially, and can be put into use as received and without further treatment by the user.

According to the present invention there is provided a nonacid refractory composition containing a carbonaceous bond material, which remains properly moldable and readily utilizable, even when exposed to extreme conditions of temperature in transportation or storage, and which exhibits good resistance to atmospheric conditions during storage and handling. The composition according to the present invention comprises nonacid or basic refractory particles, of grain sizes as desired, a hard, finely divided cokable carbonaceous bonding agent having a softening point of at least 250° F., and a liquid organic solvent for such hard carbonaceous bonding material. The composition of the present invention consists essentially of the nonacid refractory particles, in thorough admixture with about 1.0% to 12% of such hard cokable carbonaceous material and from 0.5% to 5% of the liquid solvent, these percentages being by weight on the total weight of the mass.

The refractory grain materials useful in the present invention include any nonacid or basic refractory grain material which it is desired to use in the composition, such as periclase, deadburned magnesia or deadburned magnesite, magnesia-spinels, deadburned dolomite, alumina grains, chromite, carbon grains, silicon carbide or any desired admixtures of such grains with each other or with other nonacid or basic refractory grains.

In a particularly advantageous embodiment of the present invention there is employed an admixture of from 40% to 80% of deadburned dolomite grains of particle sizes larger than, or retained on, a 35 mesh screen, for instance, passing 8 mesh and retained on 35 mesh, and from 20% to 40% of periclase particles passing through a 100 mesh screen. In another embodiment the deadburned dolomite is substantially all retained on a 35 mesh screen and the periclase particles substantially all pass through a 35 mesh screen. In any event, the grain sizing is selected according to the usual good practice in the art, to obtain the desired densities upon ramming or otherwise forming or placing the material into, or for use in, the furnaces.

The cokable, carbonaceous bonding material which is incorporated in the composition of the present invention has a softening point of at least 250° F., when tested by the cube-in-air method, commonly employed in this art, and it preferably has a softening point of at least 300° F. One coal tar pitch which has been found very satisfactory for use as such component in this composition has a softening point of from 300° F. to 400° F.; and another suitable coal tar pitch has a softening point of from 300° F. to 320° F. The carbonaceous bonding agent has a softening point sufficiently high that it can be milled, and incorporated in the mix in rather finely divided form, and is intimately admixed and interdispersed through the refractory particles. The hard pitch is at least partly dissolved by the liquid solvent and also upon heating in a furnace solution is enhanced. Additionally, any undissolved hard pitch softens and flows to thoroughly coat the grains and to bond them into a cohesive whole of adequate strength. One suitable coal tar pitch which has been found useful in the composition of this invention is a flaked pitch milled to powder form and which has a softening point of 300–320° F. and a coking value (Conradson) of at least 55% by weight, a maximum of 1% distillate up to 300° C. and a maximum of 5% by weight distillate up to 355° C., a specific gravity of 1.30 minimum, and is 30% to 40% by weight insoluble in benzol. The cokable agent is added in finely divided form to provide good dispersion thereof throughout the refractory mass. It has been found advantageous to incorporate such cokable agent in particle sizes whereof at least 90% pass through at 65 mass screen.

The liquid organic solvent used in the practice of this invention is a material of commerce known as anthracene oil, a distillation product obtained from tar resulting from the destructive distillation of coil to produce coke. Anthracene oil, also known as heavy oil, has a boiling range of approximately 270° C. to 350° C. and is removed in the distillation of tar after the light oil fraction and the intermediate oil fraction come off. It has been found especially useful to incorporate from 2.5% to 4.0% anthracene oil in the compositions of this invention.

In one method of preparing the composition of the present invention the refractory particles are selected in suitable sizes according to good practice, known in this art, to obtain the desired packing and density; and these are admixed with 1% to 12% by weight of powdered cokable, carbonaceous bonding agent having a softening point of at least 250° F., and preferably of at least 300° F., and the whole is then thoroughly blended with the addition of 0.5% to 5.0% by weight of the liquid solvent as described herein. In a preferred method, the coarse portion of the refractory particles is first mixed thoroughly with the liquid solvent and thereafter the finely divided refractory particles and the pulverized or powdered cokable carbonaceous material are added thereto with thorough mixing. In any method of mixing, the operation should be carried out below the softening point of the powdered carbonaceous material, to prevent later rehardening thereof with reduction in workability of the composition; and preferably mixing or blending is carried out at not over 110° F.

It is an advantage of a ramming composition made according to this invention that it remains workable and flows easily at ordinary temperatures of transportation and storage prior to being fired in place in a furnace. It is especially advantageous that such composition retains these characteristics at low temperatures, e.g., below about 40° F. to 50° F., whereas a particular difficulty with prior art compositions containing cokable carbonaceous bonding agents had been that they tended to set up, harden and become unworkable as ramming or casting mixes when transported or held for any substantial period of time at winter temperatures, for example. In the latter instance, the desired particulate nature of the product, and cohesiveness after ramming, will have been essentially lost or drastically changed in the hitherto known products. With the ramming compositions of the present invention, on the other hand, the particulate nature of the mix is essentially retained and it remains flowable under severe winter temperature conditions. It is a particular advantage in making bricks or cast shapes that the forming operations can be carried out at room or ambient temperatures; and it is not necessary, as it has been heretofore, to heat the ingredients of the batch to liquefy the carbonaceous bonding agent. At the same time, it is possible by the present invention to obtain a high coking value, or carbon content after coking, with consequent better strength, improved resistance to attack by slag and metal, and better service life as compared to refractory products made in a similar way except that tar only is incorporated without the incorporation of the liquid solvent as described herein. Further practical and important advantages of the composition of the present invention are that it is not necessary to heat the mix at the site of use and prior to installation, thus saving time, fuel and other costs; and that the mix is dry and easily handled, e.g., can be compressed into a dry ball or mass without sticking to the manipulating means.

The following example will demonstrate more clearly the mode of carrying out the present invention.

*Example I*

There is prepared a batch containing as one component 62.0% by weight of deadburned dolomite of the following chemical analysis: 57.2% CaO, 37.2% MgO, 0.8% $SiO_2$, 4.7% $Fe_2O_3$ and 0.1% $Al_2O_3$. The deadburned dolomite is of particle size substantially all passing 8 mesh and retained on 35 mesh. There is also incorporated 31.9% by weight periclase which has been ball-milled to particle size substantially all passing 100 mesh and exhibiting a specific surface of 2700 sq. cm. per gram, and having the following analysis, by weight: 5.2% $SiO_2$, 0.4% $Fe_2O_3$ and 0.3% $Al_2O_3$, 1.1% CaO and 93.0% MgO (by difference).

There is also admixed 2.4% by weight of pulverized coal tar pitch, of particle sizing such that at least 90% passes 65 mesh. This pitch has a softening point (cube-in-air method) of 300–320° F., 30–40% by weight insoluble in benzol, at least 55% by weight coking value (Conradson method), maximum 1% by weight distillate to 300° C., maximum 5% by weight distillate to 355° C., and minimum 1.30 specific gravity.

There is also incorporated 3.7% by weight commercially available heavy oil, the product used in this example being a liquid containing about 0.1% by volume water, about 0.05% by weight material insoluble in benzol, and having 0.0% distillation to 300° C., 2.3% distillation to 315° C., 42.4% distillation to 355° C., and a specific gravity (100/60° F.) of 1.16.

In preparing the batch, the dolomite was mixed with the heavy oil for 2 minutes and then the fine periclase and pitch blended with the dolomite-heavy oil mixture and mixing continued for 5 minutes. The composition, after storage for 40 days at temperatures as low as 40° F., was free of lumps and was readily rammed to a good dense structure. For example, a specimen stored for 40 days at temperatures as low as 40° F. and then rammed at a temperature of 81° F. showed a rammed density of 172 pounds per cubic foot. By way of comparison, another specimen of the same composition which was not subjected to extended storage at low temperatures but which was rammed "fresh" at 74° F. showed a rammed density of 174.5 pounds per cubic foot. On the other hand, a commercially available tar bonded ramming mix which was stored at a temperature of 45° F. and then rammed showed a rammed density of only 146 pounds per cubic foot. It will be understood that, in general, higher rammed densities will be obtained if the composition is heated to about 100° F., for example 90° F. to 100° F., prior to ramming.

In this specification and claims, percentages and parts are by weight unless otherwise indicated. Mesh sizes referred to herein are Tyler standard screen sizes which are defined in Chemical Engineers' Handbook, John H. Perry, editor-in-chief, 3d edition, 1950, published by McGraw-Hill Book Company, at page 963. For convenience, a fired dolomite component may sometimes be referred to herein merely as "dolomite" but where incorporated in a refractory batch it is to be understood to refer to dolomite which has been fired and deadburned, e.g., by firing at 1500° C. to 1800° C. until deadburned. Analyses of mineral components are reported in the usual manner, expressed as simple oxides, e.g., MgO, $SiO_2$, although the components may actually be present in various combinations, e.g., with each other. It will be understood that the compositions of this invention can be used to make preformed shapes such as bricks, for example by dry pressing or by vibration molding.

Having now described the invention, what is claimed is:

1. A refractory composition capable of being rammed and remaining in flowable particulate form after an extended period of storage at a temperature of 40° F., said composition consisting essentially of nonacid refractory particles, from 1.0% to 12% by weight of a solid, particulate pitch having a softening point of from about 300° F. to about 400° F., and from 0.5% to 5% by weight of anthracene oil.

2. A refractory composition according to claim 1 wherein said pitch is of a particle size such that at least 90% passes a 65 mesh screen.

3. In the method of preparing a refractory composition suitable for lining high temperature metallurgical furnaces and capable of being rammed and remaining in flowable particulate form after an extended period of storage at a temperature of 40° F. wherein a mixture of coarse and finely divided nonacid refractory particles is admixed with powdered pitch bonding agent having a softening point of from about 300° F. to about 400° F., the improvement comprising admixing at a temperature below the softening point of said powdered pitch said coarse refractory particles with from 0.5% to 5% of anthracene oil and subsequently adding with thorough admixing said finely divided refractory particles and from 1% to 12% of said powdered coal tar pitch.

4. A method according to claim 3 wherein said powdered pitch is of a particle size such that at least 90% passes a 65 mesh screen.

5. A refractory composition for ramming into linings in furnaces adapted to operate at high temperatures, said composition being adapted to storage at a temperature of 40° F. while remaining in flowable particulate form, said composition consisting essentially of: nonacid refractory particles; from 2.5 to 4.0% anthracene oil; and from 1.5 to 5.0% powdered coal tar pitch of softening point from 300–320° F. and of a particle size such that 90% passes through a 65 mesh screen.

References Cited by the Examiner

UNITED STATES PATENTS 3,141,783  7/1964  Weaver _____ 106—58

FOREIGN PATENTS 690,859  4/1953  Great Britain.

References Cited by the Applicant

UNITED STATES PATENTS 3,196,022  7/1965  Weaver.

FOREIGN PATENTS 690,859  4/1953  Great Britain.

TOBIAS E. LEVOW, *Primary Examiner.*

J. E. POER, *Assistant Examiner.*